United States Patent Office 3,526,495
Patented Sept. 1, 1970

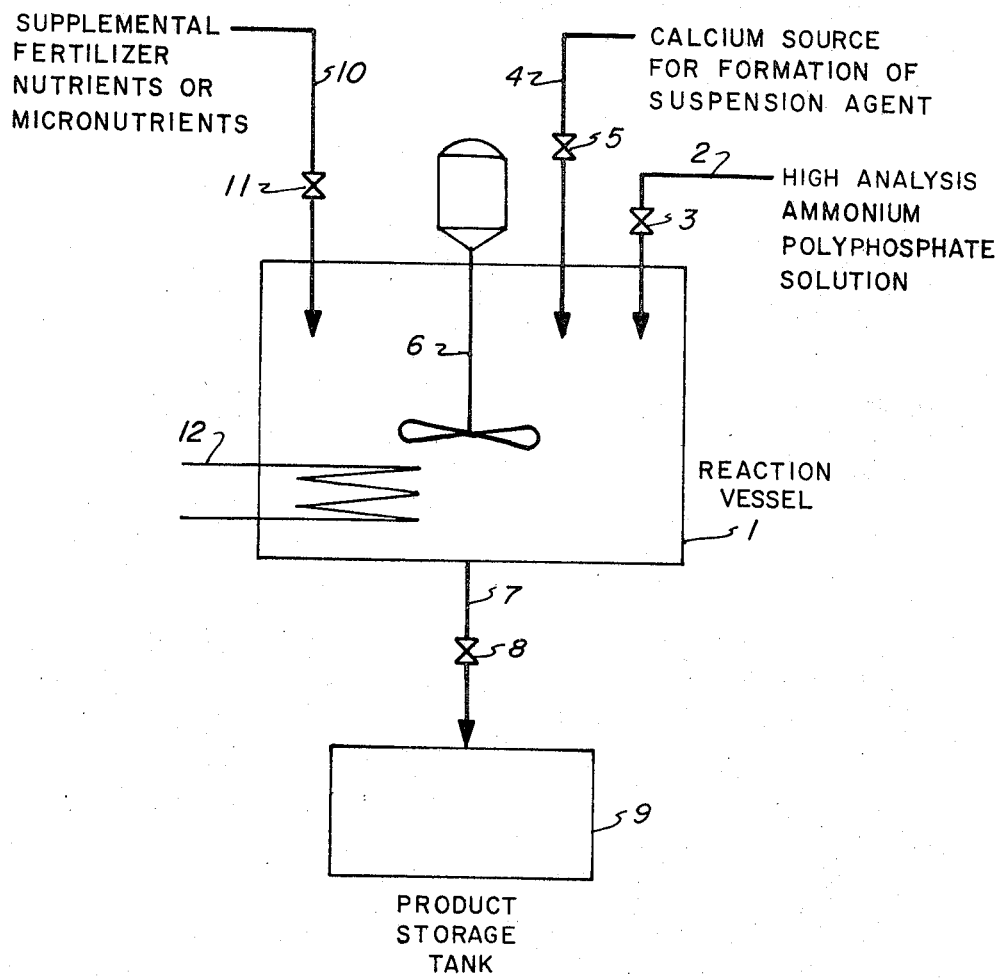

3,526,495
Ca(NH₄)₂P₂O₇·H₂O—A SUSPENDING AGENT FOR LIQUID FERTILIZERS
Otis D. Philen, Jr., Tuscumbia, and Alva W. Frazier, Florence, Ala., assignors to Tennessee Valley Authority, Muscle Shoals, Ala., a corporation
Filed Aug. 1, 1967, Ser. No. 657,598
Int. Cl. C05b 7/00
U.S. Cl. 71—34                            8 Claims

ABSTRACT OF THE DISCLOSURE

A suspension agent for liquid fertilizers containing ammonium pyrophosphate, the suspending agent formed by the reaction of a soluble calcium source such as calcium carbonate or vitreous calcium silicate with the ammonium pyrophosphate solution. The suspension agent precipitates as small scaler crystals in dendritic clusters and imparts a gel-like thixotropic property which suspends crystals already present in the liquid fertilizer and inhibits further growth of these precipitated crystals.

---

The invention herein described may be manufactured and used by or for the Government for governmental purposes without the payment to us of any royalty therefor.

Our invention relates to an improved process for the production of high-analysis fertilizer suspensions, particuuarly fertilizer suspensions prepared from ammoniated highly concentrated phosphoric acid of either the electric-furnace or wet-process type and more particularly to the production of high-analysis fertilizer suspensions in which the suspending agent exhibits a significant advantage over conventionally known and used suspending agents in that our suspending agent, in addition to providing the desired necessary suspending characteristics, further exhibits a growth inhibiting effect on crystals of mono- and diammonium phosphate formed and/or contained in such suspensions.

Heretofore the production and use of liquid fertilizers having compositions similar to those of standard dry fertilizers have been well known, and such fertilizers are increasing in popularity in the industry. Such liquid fertilizers have numerous advantages over dry mixed fertilizers in that the costs of evaporating moisture and the bagging operation are eliminated. Such liquid fertilizers greatly simplify the operation of applying plant nutrients to the soil. Furthermore, the use of liquid fertilizers effectively eliminates the difficulties due to hygroscopicity and caking often encountered in storing dry fertilizers.

However, liquid fertilizers have, in the past, had some disadvantages. In the more recent past, the advent of more concentrated liquid fertilizers by the production of ammonium polyphosphate solutions to give higher grade products such as 10–33–0 or 11–37–0 has resulted in solutions which are not stable on storage. Said products hydrolyze in hot storage tanks with a slow increase in orthophosphate content and a subsequent slow crystal growth of diammonium orthophosphate to give unreasonably large crystals which plug the jets on distribution equipment. The liquid fertilizers produced by prior-art methods also have been limited in the maximum content of plant food. The amount of water used as solvent in making liquid fertilizers in the prior-art methods has acted as a diluent which lowers the fertilizer grade, adds to the shipping weight, and increases transportation costs. Therefore, these lower grade fluid-type fertilizers and their related excess weight per unit of plant food are becoming less attractive from year to year as the general average analysis of solid fertilizers continually increases.

A recent and significant breakthrough in overcoming these disadvantages of the prior art relating to the production of liquid fertilizers previously limited in maximum plant food content and in poor economics of handling, production, and storage, is found in U.S. Letters Patent 2,950,961, Striplin et al. issued Aug. 30, 1960, and assigned to the assignee of the present invention. Striplin et al. have found that the objects of providing improved stable liquid mixed fertilizers containing substantially higher plant food contents and which exhibit superior processing, handling, and storage characteristics, can be obtained by a process wherein they introduce water, ammonia and highly concentrated superphosphoric acid into a reaction zone and therein intimately mix the constituents and control the variables so as to produce a stable fertilizer containing from about 33 to 60 weight percent total ($N+P_2O_5$). In addition to the process steps shown in the patent to Striplin et al. he discloses and teaches new compositions of matter produced thereby which are stable and substantially non-corrosive liquid mixed fertilizers containing substantially higher values of ($N+P_2O_5$) than were previously obtainable in the art. As an indication of the significance of Striplin's breakthrough in the art, one of the compositions therefrom, now generally known in the trade as 11–37–0, has come into widespread and popular use throughout the industry and at this time may be properly thought of as perhaps the backbone composition of the liquid mixed fertilizer art. The teachings of Striplin also show and disclose the production of still higher grade liquid mixed fertilizers such as, for example, 12–40–0 and 14–42–0.

Our invention is directed to an improved process for the subsequent treatment of these still higher grades of liquid mixed fertilizers taught in Striplin, specifically but not exclusively grades such as 12–40–0. It has been found, for example, that if the teachings of Striplin are followed, now existing liquid mixed fertilizer plants can produce his higher concentrated grades of liquid fertilizers, specifically the 12–40–0 grade, and that this material can be readily handled and stored, particularly during the winter months when the ambient temperatures are relatively low. However, it has now been observed that if the 12–40–0 material is stored during the hot summer months the relatively high temperatures, particularly those resulting from exposure of storage tanks to sunlight, will cause the temperature of the 12–40–0 solutions to be raised to a point wherein the hydrolysis of the higher acyclic ammonium polyphosphates therein, such as the ammonium tripolyphosphate, is accelerated through the pyro stage and results in the degradation of the solution. This degradation through hydrolysis results in the formation of disproportionate amounts of ammonium orthophosphate. Under such conditions, obviously the proportions of ammonium orthophosphate and acyclic ammonium polyphosphates is shifted from the distribution in the materials, as produced by Striplin. The net result of this shifting of the proportion of higher ammonium polyphosphates toward the ammonium orthophosphate results in the formation of crystals in solutions which, if not treated, tend to grow to sizes which ultimately render what was originally a highly useful pure liquid solution a cumbersome and hard-to-handle sludge. Our invention is therefore directed to an improved process for treating and conditioning such high-analysis liquid mixed fertilizer solution by producing high-analysis suspension type fertilizers therefrom which are stable, substantially nonsetting, of low viscosity, and which exhibit desirable flow properties. Further, we have found that in so conditioning such solutions to form high-analysis suspensions therefrom before the solutions are sent to storage under conditions of high ambient temperature, we are able to initiate the precipitation therein of a voluminous precipitate of scaler-blade crystals that behave as a stable gel suspension. Said crystals, being the compound $Ca(NH_4)_2P_2O_7 \cdot H_2O$, exhibit the desirable physical property of being extremely small, thin, blades which precipitate as dendritic rosettes having a large internal volume capable of holding an extremely large quantity of solution compared to the actual weight of $Ca(NH_4)_2P_2O_7 \cdot H_2O$ involved. The crystals do not grow to larger units on standing and are essentially insoluble in the solution; thus, a fraction of the polyphosphate content of the product is in a form that cannot hydrolyze to orthophosphate in these products. Although this compound is insoluble in the fertilizer solutions, it is citrate soluble and readily available as a plant nutrient; [1,2] thus this suspension agent contributes to the fertilizer value of the products. In this manner of treating and conditioning such material, and in our process of taking the initiative to ensure the precipitation of crystals therein in a form to produce a stable gel suspension, we preclude the later formation of crystals in such solution in undesirable forms which do not exhibit stable gel suspending characteristics, particularly when such solutions are later stored at relatively high ambient temperature. Still more importantly, when such treated and conditioned materials are subsequently stored during the hot summer months, we have found that the hydrolysis therein to the ammonium orthophosphate form is not detrimental to our materials, whereas in such materials untreated and unconditioned such hydrolysis to the ammonium orthophosphate form causes the precipitation of crystals of diammonium and/or monoammonium phosphate which grow to rather large sizes. In our process we have found that any crystals of mono- or diammonium orthophosphate which form therein are substantially and significantly retarded and inhibited in further growth by the use of our new and novel suspending agent. The product of the present invention is a suspension having a milky appearance. It is an ammonium polyphosphate suspension having a gel-like thixotropic property, the precipitate therein being pure $Ca(NH_4)_2P_2O_7 \cdot H_2O$ when any soluble calcium source such as $CaCO_3$, $CaSO_4 \cdot 2H_2O$ (gypsum), $CaO$ and any of the very soluble calcium salts such as $CaCl_2$ or $Ca(NO_3)_2$ are used to precipitate the suspending phase of $Ca(NH_4)_2P_2O_7 \cdot H_2O$. In this respect, vitreous calcium silicate is singled out as a soluble calcium source since most anyone familiar with this art would consider this an insoluble source whereas in fact at mole ratios of $CaO:SiO_2$ above 1.15 it is readily soluble in any concentrated liquid polyphosphate fertilizer solution and the precipitate therein is a mixture of $Ca(NH_4)_2P_2O_7 \cdot H_2O$ and silica gel in suspensions prepared from electric furnace superphosphoric acid. If the products are prepared from concentrated wet-process superphosphoric acid, a minor metal silicate phase will also be present due to the dissolved impurities in such acids and this will consequently add to the suspending properties of this agent. At $CaO:SiO_2$ values below 1.15, the slag is still soluble in these solutions but the rate of dissolution and reprecipitation becomes too slow for practical use; however, agents with a ratio below 1.15 can be readily dissolved if they are added to the products at an earlier stage of the fertilizer production while the solution is still acid, for example, below pH 4.0 such as in a preneutralizer stage. The same suspending solids will form in the same manner once the ammoniation is increased to that of the final product.

We have found that 3 percent of calcium calculated as CaO in the final fertilizer product is more than sufficient for the formation of stable suspensions and that usually from about 1 to 2½ percent is sufficient for the most desirable results. The higher amounts are desired when the conditioned high-analysis ammonium polyphosphate solution treated according to our process to form the suspension is later used to prepare complete mixed fertilizer, such as a 15–15–15 grade, the added amounts of suspending agent being found necessary to suspend the additional burden of crystals in such complete mixed fertilizer grades.

Heretofore in the art there has been the problem of hydrolysis of extremely high-analysis liquid mixed fertilizer such as 12–40–0 when stored during the hot summer months at high ambient temperatures and the deleterious effects of crystal growth and sedimentation thereon have been konwn and recognized, and further, various approaches to said problem have been tried. Of these approaches perhaps the one which, up to this time, yielded the best results in preventing solid sedimentation was the formation of a suspension of such high-analysis fertilizer solutions by adding thereto small amounts of suspending agents such as attapulgite, bentonite, or other clays, as is shown in U.S. Pat. 3,113,858, Slack et al., assigned to the assignee of the present invention.

Our recent studies on the storage properties of ammonium polyphosphates, particularly 12–40–0 liquid fertilizers which had been treated with attapulgite and other clays to form suspensions confirmed results shown by others in the art that such clays used in forming such suspensions during long-term storage react to form undesirable crystalline solids. We have found that attapulgite decomposes in such highly concentrated ammonium polyphosphate solutions containing pyrophosphate and releases magnesium precipitates as a series of magnesium ammonium pyrophosphates. Specifically, we have found that when the pH of such ammonium polyphosphate solutions treated with attapulgite is about 6 or more, the released magnesium precipitate is of the form $Mg(NH_4)_6(P_2O_7)_2 \cdot 6H_2O$ and when the pH is less than about 6 the precipitate released is $Mg(NH_4)_2P_2O_7 \cdot 4H_2O$. Our findings of the degradation of attapulgite clay in ammonium polyphosphate solutions are in agreement with the results of experiments presented in the publication "Reactions of Ammonium Polyphosphates With Soil Minerals," O. D. Philen, Jr., J. R. Lehr, Soil Science Society of America Proceeding, pages 196–199, vol. 31, 1967. Further, we have found that when attapulgite is used as a suspending agent, it reacts slowly with the ammonium polyphosphate solution with loss of its suspending properties by disproportioning into an amorphous hydrated silicate gel and its magnesium content reacting as indicated supra. In addition, we have found that large amounts of $NH_4H_2PO_4$ and $(NH_4)_2HPO_4$ also form as coarse crystals as large as 1.5 centimeter in diameter, which is indicative that the attapulgite or its decomposition products does not inhibit, completely, the formation of large undesirable crystals.

We have overcome the disadvantages inherent in the prior art relating to the storage of extremely high-analysis ammonium polyphosphate solutions and more particularly have overcome the problems besetting those who have previously tackled this problem by producing high-analysis suspensions therefrom through the use of clays such as bentonite and attapulgite as a suspending agent in the present invention to a substantial extent by the use of our new and novel suspending agent obtained from any reactive calcium source or other calcium source which may be thought to be unreactive but in fact will react to give $Ca(NH_4)_2P_2O_7 \cdot H_2O$, to wit, vitreous calcium silicate, which soluble calcium source in fine particulate form and having a mole ratio $CaO:SiO_2$ greater than about 1.15 is rapidly reacted with highly concentrated ammonium polyphosphate solutions in the temperature range of about 140° F. to about 180° F. to precipitate therein as the gel phase a mixture of calcium diammonium pyrophosphate monohydrate, hydrated silica gel, and metal silicates. Furthermore, several new and advantageous features over prior-art processes for handling and storing as well as treating and conditioning

---

[1] U.S. Patent No. 3,053,653.
[2] Brown, E. H., Lehr, J. R., Smith, J. P. and Frazier, A. W. "Preparation and Characterization of Some Calcium Pyrophosphates," Journal of Agricultural and Food Chemistry, vol. 11, No. 3, May–June, 1963.

ammonium polyphosphate solutions are realized by the present invention.

Among these advantageous features are: (1) the amount of suspending agent that we utilize and which is required to produce the suspension is less than that required in prior-art processes; (2) the availability problems and cost of the suspending agent that we utilize are substantially less than other suspending agents heretofore proposed in that our suspending agent can be derived from any inexpensive soluble calcium source, for example, slag from the operation of electric phosphorus furnaces, which slag heretofore had little commercial use and, therefore, for the most part was thought of as only presenting a waste disposal problem; (3) the use of our new and novel suspending agent in our process results in high-analysis fertilizer suspensions which have handling and storage characteristics superior to any high-analysis fertilizer suspensions heretofore produced, particularly in the area of utilization of ammonium polyphosphate solutions of the grades with which we are concerned; (4) our suspension agent, namely

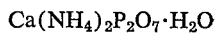

$$Ca(NH_4)_2P_2O_7 \cdot H_2O$$

has been proven to be a valuable fertilizer in itself and consequently its use as a suspending agent does not significantly reduce the fertilizer value of the product; and (5) a significant and further contributing advantage is realized when using our new and novel suspending agent as compared to the use of clay in that our material displays substantially greater and more beneficial growth inhibiting effect on any diammonium and/or monoammonium orthophosphate crystals formed and contained in the resulting product. For instance, we have found that such diammonium and/or monoammonium orthophosphate crystals in suspensions prepared through the use of clay such as attapulgite will usually grow larger than about 5 millimeters in size in the case wherein the suspension is prepared from 12–40–0 ammonium polyphosphate solution. However, when our novel suspending agent is employed, even in relatively small quantities, the diammonium or monoammonium orthophosphate crystals which form therein through the hydrolysis of the material at high ambient temperatures have been found to be less than about 2 millimeters and usually less than 500 microns in size and are easily suspended by our agent.

It is therefore an object of the present invention to provide a process for the manufacture of improved stable high-analysis fluid fertilizer suspensions from highly concentrated ammonium polyphosphate solutions containing pyrophosphate, with or without potassium, which suspensions retain the advantageous fluid form such that they have desirable flow properties and acceptable viscosities, and which suspensions are substantially unaltered or not degraded during long-term storage regardless of the fact that they may be exposed to environmental conditions found during the hot summer months.

Another object of the present invention is to provide a process for the manufacture of improved stable high-analysis fluid fertilizer suspensions from highly concentrated ammonium polyphosphate solutions containing pyrophosphate, with or without potassium, which suspensions retain the advantageous fluid form such that they have desirable flow properties and acceptable viscosities, and which suspensions are substantially unaltered or not degraded during long-term storage regardless of the fact that they may be exposed to environmental conditions found during the hot summer months, and which suspensions are prepared by the use of several readily available low-cost reactive calcium materials, to wit, slag material derived from phosphorus electric-furnace operations.

Still another object of the present invention is to provide a process for the manufacture of improved stable high-analysis fluid fertilizer suspensions from highly concentrated ammonium polyphosphate solutions containing pyrophosphates, with or without potassium, which suspensions retain the advantageous fluid form such that they have desirable flow properties and acceptable viscosities, and which suspensions are substantially unaltered or not degraded during long-term storage regardless of the fact that they may be exposed to environmental conditions found during the hot summer months, which suspensions are prepared by the use of several readily available low-cost reactive calcium sources, to wit, slag material derived from phosphorus electric-furnace operations, and which suspensions exhibit growth inhibiting characteristics on crystals of mono- and/or diammonium phosphate formed therein substantially greater than suspensions formed from such ammonium polyphosphate solutions wherein the suspending agent is a clay such as attapulgite and bentonite.

Still further and more general objects and advantages of the present invention will appear from the more detailed description set forth below, it being understood, however, that this more detailed description is given by way of illustration and explanation only and not by way of limitation since various changes therein may be made by those skilled in the art without departing from the spirit and scope of the present invention.

In carrying out the objects of our invention in one form thereof, we employ a reactor vessel equipped with mechanical mixing means wherein we add as our starting material high-analysis ammonium polyphosphate solutions having a pH of approximately 5 to 7, which may have been previously produced by the Striplin et al. patent, supra. Simultaneously, or subsequently, depending on whether or not we carry our our process on a continuous or a batchwise operation, we add to our starting material in order to precipitate the suspending agent a finely ground reactive calcium source, one of which is vitreous calcium silicate derived from electric-furnace phosphorus slag, which vitreous calcium silicate has a mole ratio of $CaO:SiO_2$ of at least 1.15. The temperature in the reactor vessel is maintained within a predetermined range to ensure that (1) the slag reacts rapidly with the ammonium polyphosphate solution, and (2) the temperature is below that at which any significant hydrolysis of the introduced ammonium polyphosphate solution would occur during the short time of mixing, or the temperature may be reduced provided that the time of agitation in the reaction vessel is increased so as to ensure that the vitreous calcium silicate slag has reacted with the suspension fertilizer. In some instances wherein we are operating near the maximum of our temperature range, we have found it desirable to cool the resulting high-analysis suspension to further minimize on any hydrolysis of the ammonium polyphosphate therein. Since vitreous calcium silicate has been demonstrated to be a useable calcium source in our examples and since it is considered by one versed in the art to be relatively insoluble, most all other sources of calcium of higher solubility are more reactive, i.e., $Ca(NO_3)_2$, $CaO$, $CaCl_2$, etc., and do not require a predetermined temperature range for the reaction to occur. In other words, the rates of reaction are greater and the suspension agent is readily formed at ambient temperatures.

Our invention, together with further objects and advantages thereof will be better understood from a consideration of the following description taken in connection with the accompanying drawing in which:

The drawing is a flowsheet generally illustrating principles of our novel process which results in the production of high-analysis fertilizer suspensions having the superior properties and characteristics enumerated supra.

Referring now more particularly to the drawing, a high-analysis ammonium polyphosphate solution from a source not shown is fed to our reaction vessel 1 via line 2 and means for control 3; simultaneously (in this case the operation is described in the continuous embodiment) our new and novel suspending agent, which possesses the unique characteristics to impart to our suspension the properties enumerated above, is fed to reaction vessel 1 from a source not shown via line 4 and means for control of flow 5. As may be seen, reaction vessel 1 is equipped with agitating means generally illustrated as motor and impeller means 6. We have found that the suspension properties of the agent is dependent upon the degradation of the agent and the formation of calcium diammonium pyrophosphate monohydrate therein. Further, we have found that when a source of vitreous calcium silicate such as, for example, phosphorus furnace slag is used, solubility of the source is dependent upon the $CaO:SiO_2$ mole ratio and is greatest when such mole ratio exceeds 1.15. We have found that the slag from TVA's electric phosphorus furnace varies in this weight ratio of $CaO:SiO_2$ anywhere from about 1.08 to about 1.30. As has been noted supra, we maintain the temperatures in reaction vessel 1 by heater element 12 within a predetermined range so as to ensure the rapid reaction of the slag with the ammonium polyphosphate solution introduced thereto and also to keep the temperature range below that at which substantial hydrolysis of said ammonium polyphosphates would occur during the mixing operation. We have found that this temperature range in reactor 1 should be maintained between about 140° F. and 180° F. The resulting high-analysis fertilizer suspension is withdrawn from reactor vessel 1 via line 7 and means for control of flow 8 to product storage 9. When the more soluble calcium sources are used to form the suspending agent or when furnace slag is added prior to complete ammoniation, i.e., when the ammonium polyphosphate solution is more acidic, the temperature for the reaction is not significant; likewise the ratio of $CaO:SiO_2$ of the slag is not significant.

In another embodiment of our invention wherein we desire to produce a high-analysis fertilizer suspension containing all three of the principal plant nutrients, to wit, nitrogen, phosphorus (expressed as $P_2O_5$), and potassium (expressed as $K_2O$), or micronutrient materials either as a soluble form or as suspended solids, we can add these supplemental materials, such as potassium chloride, or others, to reactor vessel 1 from a source not shown via line 10 and means for control of flow 11. In such instances, particularly when the finished grades are about 15–15–15, we have found that we have to use upwards to about 2½ percent by weight of calcium introduced via line 4; whereas when we are producing lower grade fertilizer suspensions, we have found that as little as 1 percent by weight of calcium need be added to reactor vessel 1 via line 4.

Thus, it may be seen from the above description taken in connection with the drawing that principally all of the high-analysis fertilizer suspensions which we desire to produce can be made by the use of a soluble calcium source which produces our suspending agent, specifically $Ca(NH_4)_2P_2O_7 \cdot H_2O$, but not excluding minor suspending agents such as hydrated silica gel and metal silicates when phosphorus furnace slag is chosen as the reactive calcium source. Further, it may be seen that our suspending agent is produced when the high-analysis ammonium polyphosphate fertilizer solution contains at minimum stoichiometrical amounts of pyrophosphate for the amount of calcium as CaO in our chosen soluble calcium source, and that other condensed phosphates such as $P_3O_{10}$ may or may not be present in our ammonium polyphosphate liquid fertilizer solution.

Finally, it may be seen that we can alter the amount of soluble calcium source which precipitates our principal suspending agent, $Ca(NH_4)_2P_2O_7 \cdot H_2O$, in order to produce higher grade suspensions such as 15–15–15, of which our suspending agent will suspend the solid components of the suspension fertilizer, and that we also may add desired amounts of chosen micronutrients in soluble or solid form to the suspension fertilizer.

As has been shown supra, we have found that the solubility of several soluble calcium sources, to wit, a unique suspending agent, vitreous calcium silicate—the major component of electric-furnace phosphorus slag—is relatively high.

Upon dissolution our soluble calcium source in the high-analysis ammonium polyphosphate solution, we have found that the calcium reacts to form a gelatinous precipitate of calcium diammonium pyrophosphate monohydrate crystals. This particular compound has been reported previously in the literature but was formed by treating at room temperature a solution of $CaH_2P_2O_7$ with $NH_4OH$ to form a mixture with a pH of 7 or more and in which the water was no more than 95 percent of the total weight of the mixture. (See Agricultural and Food Chemistry, May/June 1963, vol. 11, pages 214–222; also Jan./Feb. 1964, vol. 12, pages 70–73.) In addition, a process for producing this compound in pure form is found in U.S. Letters Patent 3,053,623, E. H. Brown, issued Sept. 11, 1962, and assigned to the assignee of the present invention. Although this composition in its pure form has been reported in the literature supra, we could not confirm the identity of $Ca(NH_4)_2P_2O_7 \cdot H_2O$ as our suspending agent in a gel-like thixotropic suspension which precipitated from the reaction of phosphate furnace slag and high-analysis ammonium polyphosphate solution, until said gel-like thixotropic suspension was identified by petrographic and X-ray diffraction methods. It appeared that in the gelatinous precipitate the silicate component of our soluble calcium source combined with any dissolved metals to form metal silicate gels and hydrated silica gel which would also act as suspension aids. To test this theory, we made tests to establish the effectiveness of metal silicates and hydrated silica gel by suspending some of the common dissolved impurities and micronutrients in commercially available high-analysis ammonium polyphosphate liquid fertilizers, to wit, 12–40–0. In these tests, soluble sodium silicate $Na_2SiO_3$ and the metal cations Fe, Al, and Zn were added to clear 12–40–0. The Fe, Al, and Zn readily formed gelatinous precipitates with the silicates, which appeared to suspend favorably in the 12–40–0. The gels, however, were amorphous to X-ray diffraction and the analysis of this portion of the gel precipitate has not been determined. The following is a tabulation of the compositions of typical electric-furnace phosphorus slag which we have used and analyzed.

| Composition of typical slag: | Percent by weight |
|---|---|
| CaO | 47.4–48.5 |
| $P_2O_5$ | 0.4–0.8 |
| $SiO_2$ | 40.7–41.9 |
| $Al_2O_3$ | 0.8 |
| $K_2O$ | Approx. 1 |

As may be seen from the above tabulation of the principal impurities in electric-furnace phosphorus slag the phosphorus and potassium are neither objectionable nor undesirable, but rather act to add plant food values to the suspension. Accordingly, therefore, it would appear that in the suspensions prepared according to the present invention the gel-like phase thereof has as its major constituent crystals of calcium diammonium pyrophosphate monohydrate and as its minor constituent hydrated silica gel and metal silicates consisting essentially of iron and aluminum silicates.

As we have indicated, we prefer to react our soluble calcium source phosphate furnace slag with the ammonium polyphosphate solutions at a temperature in the range from 140° F. to 180° F. in that in this range we obtain both rapid reaction and at the same time hold any hydrolysis of the ammonium polyphosphate during said mixing operation to a minimum. We have found, however, that if it is desired, the reaction can be carried out at about room temperature, but again only when the mole ratio $CaO:SiO_2$ is above 1.15 (preferably above about 1.20) and when the reaction time is sufficient to allow complete decomposition of the vitreous calcium silicate. However, if it is necessary our suspension agent with $CaO:SiO_2$ mole ratio less than 1.15 may be used in high-analysis 12–40–0 and introduced at an intermediate step in a reactor vessel prior to complete ammoniation of 12–40–0 grade. At this step the 1.15 $CaO:SiO_2$ vitreous calcium silicate is decomposed partly by the temperature of ammoniation and by the lower pH levels of the super acid being ammoniated. Our suspension agent may be used in any ammonium polyphosphate liquid fertilizer as long as stoichiometric amounts of pyrophosphates are present in the liquid fertilizer to react with the calcium in our soluble calcium source.

In storage tests, we have observed that after three months of storage at both room temperature and upwards to about 120° F., which approximates the upper limit in which our fertilizer suspensions are intended to be stored during the hot summer months, substantially all of the high-analysis fertilizer suspensions prepared by our process exhibited superior storage properties and the $NH_4H_2PO_4$ and/or $(NH_4)_2HPO_4$ crystals therein were no larger than 500 microns and that the crystals of $Ca(NH_4)_2P_2O_7 \cdot H_2O$ and $(NH_4)_4P_2O_7$ were smaller than about 25 microns and the metal silicates and hydrated silica gel particles were less than 5 microns. In similar tests where we raise the environmental temperature during a period of about 45 days there was no evidence of any significant increase in crystal growth or change in the precipitating crystalline species.

In order that those skilled in the art may better understand how the present invention can be practiced and more fully and definitely understood, the following examples and data of processes we have used in the production of such high-analysis fertilizer suspensions of significantly improved storage characteristics and growth inhibiting effect on crystals of diammonium and/or monoammonium orthophosphate therein are given by way of illustration and not by way of limitation.

High-analysis liquid fertilizers are obtained by a process substantially similar to that taught in Striplin, supra, wherein water, ammonia, and highly concentrated superphosphoric acid are introduced into a reaction vessel and intimately mixed, and the reaction temperature ranges from 170° to 180° F. This high-analysis liquid fertilizer is pumped into a container wherein a suspension agent is introduced and dispersed into the high-analysis liquid fertilizer thereby producing a suspension fertilizer.

EXAMPLE I

We used as a typical grade high-analysis liquid fertilizer grade 12–40–0, and we heated a desired amount in a Pyrex beaker to a reaction temperature of about 170° to 180° F.

At this point we add a soluble calcium source, to wit, vitreous calcium silicate slag, particle size −100 mesh, to the Pyrex beaker and cause it to be dispersed evenly without agglomeration by intimately mixing the slag and the 12–40–0 grade fertilizer with an air motor driven stirrer or agitator. The slag is evenly dispersed in the high-analysis 12–40–0 for a period of 20 to 30 minutes to prevent settling and caking of the phosphate furnace slag in the bottom of the vessel before degradation of the slag occurs.

The effectiveness of our soluble calcium source is greatest with the complete degradation of the vitreous calcium silicate slag, whereby are formed our suspension agents, $Ca(NH_4)_2P_2O_7 \cdot H_2O$, metal silicates, and hydrated silica gel, each having outstanding suspending properties due to their crystalline and particulate nature. The typical reactions which take place are represented by the following chemical equations:

$CaSiO_3$ + ammonium polyphosphates →
$Ca(NH_4)_2P_2O_7 \cdot H_2O$ + hydrated silica gel + metal silicates One (1) unit weight of our soluble calcium silicate with complete reaction with high-analysis 12–40–0 will produce approximately three (3) units by weight of suspension agents, as shown by the following data:

1 mole $CaSiO_3$ = 116 grams
1 mole $Ca(NH_4)_2P_2O_7 \cdot H_2O$ ∼268 grams
1 mole (hydrated silica gel + metal silicates) ∼76–100.

Thus, 116 grams calcium silicate will produce 344 to 368 grams of suspension agents, or one (1) unit weight of calcium silicate will produce approximately three (3) units by weight of suspension agents. Likewise, one (1) unit weight of CaO (mol. wt. 56) from most other soluble calcium sources such as $CaCO_3$, $CaCl_2$, $Ca(NO_3)_2$, etc. will produce about five (5) units of $Ca(NH_4)_2P_2O_7 \cdot H_2O$ (mol. wt. 268).

Our soluble calcium source, phosphate furnace slag, might be added in varied quantities to produce a desired suspension characteristic and the reaction of our source and high-analysis 12–40–0 will react quantitatively. To demonstrate the adaptability of our source, we prepared samples wherein the percent of soluble calcium source in the high-analysis 12–40–0 ranged from ½ percent to 3 percent by weight.

| Sample No. | Percent slag added to product | Percent suspension agent in product | Percent weight increase |
|---|---|---|---|
| 1 | 1 | 3.30 | 330 |
| 2 | 2 | 6.5 | 325 |
| 3 | 3 | 9.54 | 318 |
| 4 | 4 | 12.64 | 316 |
| 5 | 5 | 16.3 | 326 |

To demonstrate the suspending characteristics of our suspension agent, we prepared samples of 12–40–0 wherein the quantity of soluble calcium source phosphate furnace slag added ranged from ½ percent to 4½ percent, whereby the viscosity of the suspension fertilizer was increasing proportionally with an increase in quantity of suspension agent produced.

| Test No. | Percent slag [1] | Viscosity, cps.[2] |
|---|---|---|
| 1 | 0.5 | 150 |
| 2 | 1.0 | 630 |
| 3 | 1.5 | 950 |
| 4 | 2.0 | 1,440 |
| 5 | 2.5 | 4,000 |
| 6 | 3.0 | 90,000 |
| 7 | 3.5 | >160,000 |
| 8 | 4.0 | >160,000 |

[1] Slag $CaO:SiO_2$ ratio 1.19.
[2] Viscosity measured after storage several months at room temperature.

EXAMPLE III

To further demonstrate the suspension characteristics of our suspending agents, $Ca(NH_4)_2P_2O_7 \cdot H_2O$, silica gel, and metal silicates, we prepared under the same controlled conditions samples of high-analysis 12–40–0 and other soluble calcium sources.

As has been noted supra, the efficient suspension characteristics of our source is dependent upon the degradation of the calcium source and formation of our primary suspending agent, $Ca(NH_4)_2P_2O_7 \cdot H_2O$, and metal silicates, and hydrated silica gel. As the data of the experiment indicates, the quantity of suspension agents produced is dependent on the percent CaO available. This data also indicates that the efficiency of our suspension is further enhanced by the presence of the metal silicates and hydrated silica gel.

| Agent [1] | Percent CaO in agent | Percent CaO in product | Viscosity, cps. | Spindle,[2] rev./min. |
|---|---|---|---|---|
| $Ca(H_2PO_4)_2 \cdot 2H_2O$ | 22 | .066 | 250 | 60 |
| $Ca(NO_3) \cdot 4H_2O$ | 24 | .072 | 300 | 60 |
| $CaCl_2 \cdot 2H_2O$ | 38 | 1.14 | ∼7,000 | 12 |
| $CaCO_3$ | 56 | 1.68 | ∼40,000 | 1.5 |
| Slag ($CaO:SiO_2 = 1.15$) | 48 | 1.44 | ∼50,000 | 1.5 |

[1] 3% soluble calcium source by weight; stored several weeks; each sample agitated five minutes at 80° F. prior to measurement of viscosity.
[2] Measurement made by Brookfield viscometer model (L.V.T. No. 3 spindle).

The tabulation shows the relative viscosities obtained at different calcium levels as determined by two different methods as well as demonstrating the usability of several different calcium sources, and that silicate from the slag in combination with our agent is very effective.

EXAMPLE IV

To demonstrate that our source phosphate furnace slag can be used successfully in suspending various grades of suspension fertilizers, we prepared samples of high-analysis 12–40–0 liquid fertilizer wherein various quantities of our source were added to prepare low-grade or high-grade suspension fertilizers.

As little as ½ percent by weight of phosphate furnace slag suspended ammonium polyphosphate crystals which precipitate from the high-analysis 12–40–0, and our suspension agents, $Ca(NH_4)_2P_2O_7 \cdot H_2O$, silica gel, and metal silicate produced by reaction of phosphate furnace slag with the high-analysis 12–40–0 inhibited the growth of crystals such as $NH_4H_2PO_4$ and/or $(NH_4)_2HPO_4$.

In the preparation of higher grade suspension fertilizer, such as 15–15–15, 3 percent phosphate furnace slag suspended the fertilizer component crystals added and also inhibited latent growth of $(NH_4)_2HPO_4$ and/or $$NH_4H_2PO_4$$

crystals.

While we have shown our invention in but several forms thereof, it will be obvious to those skilled in the art that it is not so limited but rather is susceptible to various changes and modifications without departing from the spirit thereof, and we desire therefore that only such limitations shall be placed thereon which are specifically set forth in the appended claims.

What we claim as new and desire to secure by Letters Patent of the United States is:

1. A method of producing a stable suspension-type fertilizer having: a high plant food content in the range from about 40 percent to about 60 percent total $$N+P_2O_5+K_2O$$

good flow properties; and low viscosity, which comprises the steps of:
  (1) introducing into a reaction vessel a stream of high-analysis ammonium polyphosphate fertilizer solution containing pyrophosphate as one of the phosphate constituents;
  (2) simultaneously introducing into said reaction vessel a stream of a calcium source capable of producing the suspending agent, $Ca(NH_4)_2P_2O_7 \cdot H_2O$;
  (3) intimately mixing said streams of high-analysis ammonium polyphosphate solution and said soluble calcium source; and
  (4) withdrawing from said reaction vessel the resulting high-analysis fertilizer suspension;

said process characterized by the fact that the high-analysis fertilizer suspension resulting therefrom is substantially resistant to crystal growth and change in precipitated crystalline species therein during subsequent prolonged storage.

2. The process of claim 1 wherein the high-analysis ammonium polyphosphate solution added to said reactor vessel has as one phosphate constituent pyrophosphate in sufficient quantity to react with the calcium present to yield $Ca(NH_4)_2P_2O_7 \cdot H_2O$, said quantity of pyrophosphate sufficient to provide at least one mole of $P_2O_7$ per mole of Ca added.

3. The process of claim 1 wherein the soluble calcium source is vitreous calcium silicate slag, wherein the $$CaO:SiO_2$$

ratio is greater than about 1.15, and wherein the temperature during the reaction is at least about 140° F.

4. The process of claim 1 wherein the reaction of calcium silicate slag and high-analysis ammonium polyphosphate liquid fertilizer solution produces the primary suspending agent $Ca(NH_4)_2P_2O_7 \cdot H_2O$ and minor suspending agents of hydrated silica gel and metal silicates, the metal silicates selected from the group consisting of divalent metal cations, tri-valent metal cations, and mixtures thereof.

5. The process of claim 1 wherein the ratio of the soluble calcium silicate slag, $CaO:SiO_2$, is less than about 1.15 and reaction temperature is less than about 140° C. whereby the calcium source is added to the high-analysis ammonium polyphosphate solution at an intermediate step prior to complete ammoniation thereof, during which intermediate step the pH of the solution being ammoniated is below about 5 to ensure solubilization of the calcium source in the ammonia polyphosphate solution.

6. The process of claim 1 wherein the product immediately therefrom contains ammonium phosphate crystals less than about 500 microns; primary suspending agent $Ca(NH_4)_2P_2O_7 \cdot H_2O$ crystals less than about 50 microns, and silicate particles less than about 5 microns in size.

7. The process of claim 1 wherein the product after storage under ambient conditions contains ammonium phosphate crystals less than 2 mm. in size, the growth of said crystals being substantially reduced by the growth inhibiting characteristics of the primary suspending agent $Ca(NH_4)_2P_2O_7 \cdot H_2O$, said growth inhibiting characteristics primarily resulting from reduced movement of phosphate ions in the high-analysis ammonium polyphosphate solution.

8. The process of claim 1 wherein the soluble calcium source added to the high-analysis ammonium polyphosphate fertilizer is added in predetermined quantities sufficient to produce a high-analysis fertilizer suspension for use as a fluid base of desired viscosity to suspend solid forms of later added plant nutrients.

References Cited

UNITED STATES PATENTS 3,253,370    2/1966    Kealy _____ 71—64 X

REUBEN FRIEDMAN, Primary Examiner

R. BARNES, Assistant Examiner

U.S. Cl. X.R.

71—64